United States Patent
Kato et al.

(10) Patent No.: US 9,637,618 B2
(45) Date of Patent: May 2, 2017

(54) BEAD FILLER RUBBER COMPOSITION AND PNEUMATIC TIRE

(71) Applicant: THE YOKOHAMA RUBBER CO., LTD., Minato-ku, Tokyo (JP)

(72) Inventors: Manabu Kato, Hiratsuka (JP); Ryota Takahashi, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/311,404

(22) PCT Filed: Dec. 19, 2014

(86) PCT No.: PCT/JP2014/083770
§ 371 (c)(1),
(2) Date: Nov. 15, 2016

(87) PCT Pub. No.: WO2015/173994
PCT Pub. Date: Nov. 19, 2015

(65) Prior Publication Data
US 2017/0081506 A1 Mar. 23, 2017

(30) Foreign Application Priority Data
May 16, 2014 (JP) ................................. 2014-102237

(51) Int. Cl.
*B60C 1/00* (2006.01)
*C08L 7/00* (2006.01)

(52) U.S. Cl.
CPC ................. *C08L 7/00* (2013.01); *B60C 1/00* (2013.01); *B60C 2001/005* (2013.04); *C08L 2205/03* (2013.01)

(58) Field of Classification Search
CPC ....... B60C 1/00; B60C 2001/005; C08L 7/00; C08L 2205/03
See application file for complete search history.

(56) References Cited

U.S. PATENT DOCUMENTS

| | | | |
|---|---|---|---|
| 6,355,826 B1 * | 3/2002 | Parker | C07C 291/06 558/299 |
| 2010/0132868 A1 * | 6/2010 | Hergenrother | C08K 3/0033 152/564 |
| 2013/0207043 A1 | 8/2013 | Menozzi et al. | |

FOREIGN PATENT DOCUMENTS

| | | | | |
|---|---|---|---|---|
| JP | 2008-127464 | * | 6/2008 | ................ C08L 9/06 |
| JP | 2008-127464 A | | 6/2008 | |
| JP | 2010-241898 | * | 10/2010 | ............. C08L 21/00 |
| JP | 2010-241898 A | | 10/2010 | |
| JP | 2013-159717 | * | 8/2013 | ................ C08L 7/00 |
| JP | 2013-159717 A | | 8/2013 | |
| JP | 2013-543516 | * | 12/2013 | ............. B65D 65/02 |
| JP | 2013-543516 A | | 12/2013 | |
| JP | 2014-034622 A | | 2/2014 | |

* cited by examiner

*Primary Examiner* — Robert Harlan
(74) *Attorney, Agent, or Firm* — Carrier Blackman & Associates, P.C.; Joseph P. Carrier; William D. Blackman

(57) ABSTRACT

A rubber composition for a bead filler contains a diene rubber, a carbon black and a nitrone compound having a carboxy group; the diene rubber contains a natural rubber and a styrene-butadiene rubber, wherein the content of the natural rubber in a total of the diene rubber and the nitrone compound is not less than 60 mass %, and the content of the styrene-butadiene rubber in a total of the diene rubber and the nitrone compound is not greater than 40 mass %; the content of the carbon black is 40 to 80 parts by mass per 100 parts by mass of a total of the diene rubber and the nitrone compound; and the content of the nitrone compound is 0.1 to 10 parts by mass per 100 parts by mass of a total of the diene rubber and the nitrone compound. Such rubber composition exhibits low heat build-up after vulcanization.

20 Claims, 1 Drawing Sheet

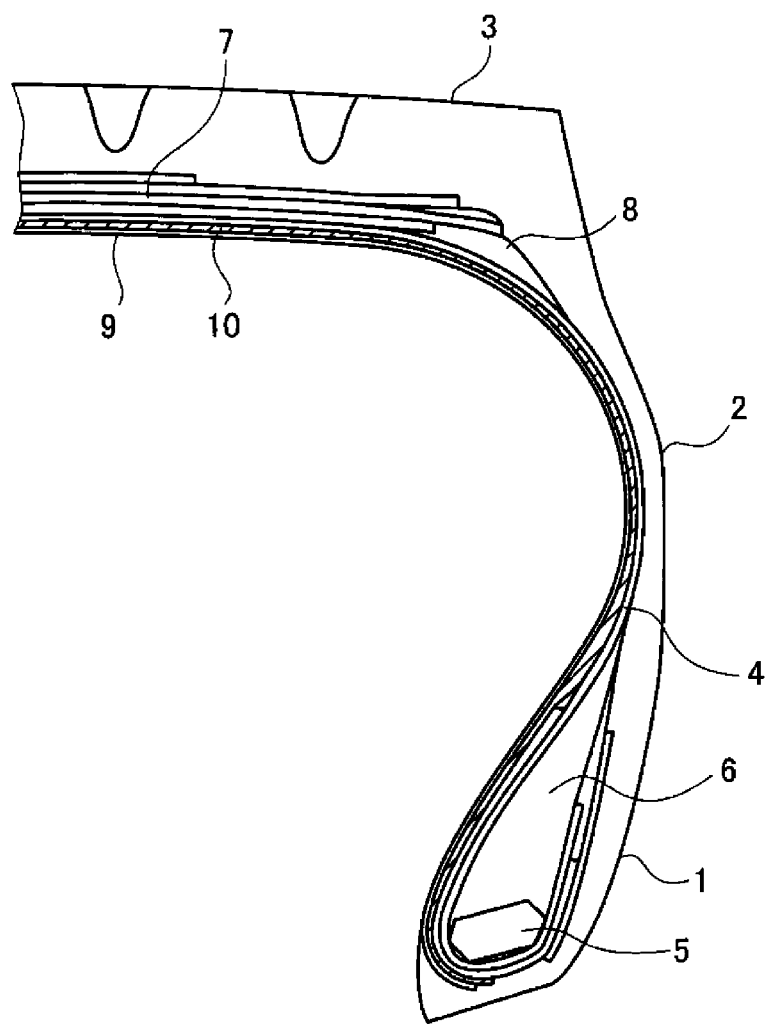

US 9,637,618 B2

BEAD FILLER RUBBER COMPOSITION AND PNEUMATIC TIRE

TECHNICAL FIELD

The present invention relates to a rubber composition for a bead filler and a pneumatic tire.

BACKGROUND ART

In general, a pneumatic tire is formed from a pair of right and left bead portions, a pair of right and left side walls, and a tire tread portion extending between both of the side walls. A carcass layer embedded with fiber cords is mounted between the pair of bead portions. An end of the carcass layer is folded around a bead core and a bead filler from a tire inner side to a tire outer side and turned up.

Generally, the bead filler is required to possess a high modulus from the viewpoint of suppressing movement of the bead portion and the end of carcass. Also, the bead filler requires low heat build-up from the viewpoint of fuel economy.

An example of a rubber composition for a bead filler is disclosed in Patent Document 1. This rubber composition for a tire bead filler contains a rubber component and a carbon black, and the rubber component contains a natural rubber and a styrene-butadiene rubber (SBR).

CITATION LIST

Patent Literature

Patent Document 1: Japanese Unexamined Patent Application Publication No. 2014-34622A

SUMMARY OF INVENTION

Technical Problem

Further improvement in modulus of a bead filler has been pursued as the demand for superior tire durability has increased.

In recent years, improvement in lower heat build-up has been also pursued due to an increased demand for improved fuel economy from the viewpoint of environmental concerns.

The present inventors studied the rubber composition containing a natural rubber, a styrene-butadiene rubber, and a carbon black according to Patent Document 1, and discovered that further improvement in modulus after vulcanization was necessary considering increased demand for superior durability required in the future. Also, the present inventors discovered that heat build-up after vulcanization was not low enough to satisfy current requirements.

Considering the present status described above, an object of the present invention is to provide a rubber composition for a bead filler exhibiting excellent low heat build-up after vulcanization and having a high modulus, and a pneumatic tire including the rubber composition.

Solution to Problem

The present inventors have conducted diligent research on the above problems, and discovered that the above problem can be solved by blending a nitrone compound having a carboxy group or by modifying SBR in the compound with the nitrone compound above, and completed the present invention.

Specifically, the inventors discovered that the object described above can be achieved by the following features.

(1) A rubber composition for a bead filler, the rubber composition containing a diene rubber; a carbon black; and a nitrone compound having a carboxy group;
the diene rubber containing a natural rubber and a styrene-butadiene rubber, wherein a content of the natural rubber in a total of the diene rubber and the nitrone compound is not less than 60 mass %, and a content of the styrene-butadiene rubber in a total of the diene rubber and the nitrone compound is not greater than 40 mass %;
a content of the carbon black being from 40 to 80 parts by mass per 100 parts by mass of a total of the diene rubber and the nitrone compound; and
a content of the nitrone compound being from 0.1 to 10 parts by mass per 100 parts by mass of a total of the diene rubber and the nitrone compound.

(2) A rubber composition for a bead filler, the rubber composition containing a diene rubber; and a carbon black; the diene rubber containing a natural rubber and a modified styrene-butadiene rubber, wherein the modified styrene-butadiene rubber is obtained by a reaction of a nitrone compound having a carboxy group with a double bond of a styrene-butadiene rubber;
a content of the natural rubber in the diene rubber being not less than 60 mass %;
an amount of the styrene-butadiene rubber used for synthesis of the modified styrene-butadiene rubber being not greater than 40 mass % with respect to the diene rubber;
an amount of the nitrone compound used for synthesis of the modified styrene-butadiene rubber being from 0.1 to 10 parts by mass per 100 parts by mass of the diene rubber; and
a content of the carbon black being from 40 to 80 parts by mass per 100 parts by mass of the diene rubber.

(3) A rubber composition for a bead filler, the rubber composition containing a diene rubber; and a carbon black; the diene rubber containing a natural rubber, a modified styrene-butadiene rubber, and a styrene-butadiene rubber, wherein the modified styrene-butadiene rubber is obtained by a reaction of a nitrone compound having a carboxy group with a double bond of a styrene-butadiene rubber;
a content of the natural rubber in the diene rubber being not less than 60 mass %;
a total amount of the styrene-butadiene rubber used for synthesis of the modified styrene-butadiene rubber and the styrene-butadiene rubber in the diene rubber being not greater than 40 mass % with respect to the diene rubber;
an amount of the nitrone compound used for synthesis of the modified styrene-butadiene rubber being from 0.1 to 10 parts by mass per 100 parts by mass of the diene rubber; and
a content of the carbon black being from 40 to 80 parts by mass per 100 parts by mass of the diene rubber.

(4) The rubber composition for a bead filler according to (2) or (3) above, wherein a degree of modification of the modified styrene-butadiene rubber is from 0.02 to 4.0 mol %, wherein "degree of modification" refers to a proportion (mol %) of double bonds modified with the nitrone compound relative to all the double bonds attributed to butadiene in styrene-butadiene rubber.

(5) The rubber composition for a bead filler according to any one of (1) to (4) above, wherein a styrene unit content of the styrene-butadiene rubber is not less than 10 mass %.

(6) The rubber composition for a bead filler according to any one of (1) to (5) above, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(7) The rubber composition for a bead filler according to any one of (1) to (6) above, wherein a nitrogen adsorption specific surface area of the carbon black is from 40 to 150 $m^2/g$.

(8) A pneumatic tire wherein the rubber composition for a bead filler described in any one of (1) to (7) above is used in the pneumatic tire.

Advantageous Effects of Invention

As described below, according to the present invention, a rubber composition for a bead filler exhibiting excellent low heat build-up after vulcanization and having a high modulus, and a pneumatic tire including the rubber composition can be provided.

BRIEF DESCRIPTION OF DRAWING

FIG. 1 is a partial cross-sectional schematic view of a tire that illustrates one embodiment of a pneumatic tire of the present invention.

DESCRIPTION OF EMBODIMENTS

Hereinafter, a rubber composition for a bead filler and a pneumatic tire of the present invention will be described.

Note that, in the present specification, numerical ranges indicated using "(from) . . . to . . . " include the former number as the lower limit value and the later number as the upper limit value.

Rubber Composition for Bead Filler

In the first embodiment, a rubber composition for a bead filler of the present invention (also referred to as "a composition of the present invention" hereinafter) contains a diene rubber, a carbon black, and a nitrone compound having a carboxy group (also referred to as "carboxynitrone" hereinafter). The diene rubber contains a natural rubber and a styrene-butadiene rubber, wherein the content of the natural rubber in a total of the diene rubber and the nitrone compound is not less than 60 mass %, and the content of the styrene-butadiene rubber in a total of the diene rubber and the nitrone compound is not greater than 40 mass %;

the content of the carbon black is from 40 to 80 parts by mass per 100 parts by mass of a total of the diene rubber and the nitrone compound; and the content of the nitrone compound is from 0.1 to 10 parts by mass per 100 parts by mass of a total of the diene rubber and the nitrone compound.

In the second embodiment, the composition of the present invention contains a diene rubber and a carbon black. The diene rubber contains a natural rubber and a modified styrene-butadiene rubber (also referred to as "carboxynitrone-modified SBR" hereinafter), wherein the modified styrene-butadiene rubber is obtained by a reaction of a nitrone compound having a carboxy group with a double bond of a styrene-butadiene rubber;

the content of the natural rubber in the diene rubber is not less than 60 mass %;

the amount of the styrene-butadiene rubber used for synthesis of the modified styrene-butadiene rubber is not greater than 40 mass % with respect to the diene rubber;

the amount of the nitrone compound used for synthesis of the modified styrene-butadiene rubber is from 0.1 to 10 parts by mass per 100 parts by mass of the diene rubber; and the content of the carbon black is from 40 to 80 parts by mass per 100 parts by mass of the diene rubber.

In the third embodiment, a composition of the present invention contains a diene rubber and a carbon black. The diene rubber contains a natural rubber, a modified styrene-butadiene rubber, and a styrene-butadiene rubber, wherein the modified styrene-butadiene rubber is obtained by a reaction of a nitrone compound having a carboxy group with a double bond of a styrene-butadiene rubber;

the content of the natural rubber in the diene rubber is not less than 60 mass %;

the total amount of the styrene-butadiene rubber used for synthesis of the modified styrene-butadiene rubber and the styrene-butadiene rubber in the diene rubber is not greater than 40 mass % with respect to the diene rubber;

the amount of the nitrone compound used for synthesis of the modified styrene-butadiene rubber is from 0.1 to 10 parts by mass per 100 parts by mass of the diene rubber; and the content of the carbon black is from 40 to 80 parts by mass per 100 parts by mass of the diene rubber.

The second embodiment and the third embodiment of the present invention correspond to an embodiment in which all or a part of SBR in the diene rubber is modified with the carboxynitrone instead of blending carboxynitrone in the first embodiment of the rubber composition of the present invention described above.

The compositions of the present invention (first to third embodiments) exhibit superior low heat build-up and high modulus presumably due to the above-described configurations. Although the reason is not clear, it is assumed to be as follows.

The composition of the present invention contains carboxynitrone or SBR modified with carboxynitrone, as described above. Because the carboxy group of the carboxynitrone (or the carboxynitrone after modification) interacts with a carbon black in the composition, a rigid three-dimensional structure of the rubber component and the carbon black is formed. It is considered that the high modulus manifests as a result. Additionally, dispersibility of the carbon black improves because the carboxy group interacts with the carbon black in the composition. As a result, it is conceived that Payne effect is reduced, and excellent low heat build-up is exhibited. That is, the first to third embodiments supposedly exhibit desired effects via the same mechanism.

The first to third embodiments of the composition of the present invention are described in detail below.

First Embodiment

As described above, in the first embodiment, the composition of the present invention (also simply referred to as the first embodiment hereinafter) contains a diene rubber, a carbon black, and a nitrone compound having a carboxy group (carboxynitrone). The diene rubber contains a natural rubber and a styrene-butadiene rubber.

Each component contained in the first embodiment will be described in detail hereinafter.

Diene Rubber

The diene rubber contained in the first embodiment contains a natural rubber and a styrene-butadiene rubber.

The diene rubber may contain a rubber component besides a natural rubber and a styrene-butadiene rubber. Such a rubber component is not particularly limited;

examples thereof include isoprene rubber (IR), butadiene rubber (BR), acrylonitrile-butadiene copolymer rubber (NBR), butyl rubber (IIR), butyl halide rubber (Br-IIR, Cl-IIR), and chloroprene rubber (CR).

Natural Rubber

The natural rubber contained in the diene rubber is not particularly limited.

The content of the natural rubber in the total of the diene rubber and the carboxynitrone described below is not less than 60 mass %. If the content of the natural rubber is less than 60 mass %, modulus or breaking strength is insufficient.

The content of the natural rubber in the total of the diene rubber and the carboxynitrone described below is preferably from 60 to 90 mass %.

Note that the "content of the natural rubber in the total of the diene rubber and the carboxynitrone" refers to a content (mass %) of the natural rubber based on the total of the diene rubber and the carboxynitrone being as 100 mass %. For example, if the composition contains 65 parts by mass of the natural rubber, 34 parts by mass of the styrene-butadiene rubber, and 1 part by mass of the carboxynitrone, the content of the natural rubber in the total of the diene rubber and the carboxynitrone is 65 mass % (=65/(65+34+1)×100).

Styrene-Butadiene Rubber

The styrene-butadiene rubber contained in the diene rubber is not particularly limited.

The styrene monomer used for the production of a styrene-butadiene rubber is not particularly limited, but examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, dimethylaminomethylstyrene, and dimethylaminoethylstyrene. Among these, styrene, α-methylstyrene, and 4-methylstyrene are preferred, and styrene is more preferred. Such a styrene monomer may be used alone, or a combination of two or more types may be used.

Examples of the butadiene monomer used for the production of the styrene-butadiene rubber is not particularly limited, but examples thereof include 1,3-butadiene, isoprene(2-methyl-1,3-butadiene), 2,3-dimethyl-1,3-butadiene, and 2-chloro-1,3-butadiene. Among these, 1,3-butadiene or isoprene is preferred, and 1,3-butadiene is more preferred. Such a butadiene monomer may be used alone, or a combination of two or more types may be used.

The content of styrene units in the styrene-butadiene rubber is not particularly limited, but is preferably not less than 10 mass %. Of these, the content of styrene units is more preferably from 15 to 30 mass %. Note that the "content of styrene units in a styrene-butadiene rubber" refers to a proportion (mass %) of styrene monomer units in a styrene-butadiene rubber.

From the viewpoint of ease of handling, the weight average molecular weight (Mw) of styrene-butadiene rubber above is preferably from 100,000 to 1,500,000 and more preferably from 300,000 to 1,300,000. In the present specification, the weight average molecular weight (Mw) is measured by gel permeation chromatography (GPC) based on calibration with polystyrene standards using tetrahydrofuran as a solvent.

The content of the styrene-butadiene rubber in the total of the diene rubber described above and the carboxynitrone described below is not greater than 40 mass %. If the content of the styrene-butadiene rubber is greater than 40 mass %, modulus or breaking strength is insufficient.

The content of the styrene-butadiene rubber in the total of the diene rubber described above and the carboxynitrone described below is preferably from 10 to 40 mass %.

The total content of the natural rubber and the styrene-butadiene rubber in the diene rubber is not particularly limited, but preferably not less than 90 mass % and particularly preferably 100 mass %.

Carbon Black

The carbon black contained in the first embodiment is not particularly limited and, for example, carbon blacks with various grades, such as SAF-HS, SAF, ISAF-HS, ISAF, ISAF-LS, IISAF-HS, HAF-HS, HAF, HAF-LS, FEF, GPF or SRF can be used.

The nitrogen adsorption specific surface area ($N_2SA$) of the carbon black is not particularly limited, but is preferably from 40 to 150 m$^2$/g, more preferably from 50 to 100 m$^2$/g, and even more preferably greater than 60 m$^2$/g.

Note that the nitrogen adsorption specific surface area ($N_2SA$) is a value of the amount of nitrogen adsorbed to a surface of carbon black, measured in accordance with JIS K6217-2:2001 (Part 2: Determination of specific surface area—Nitrogen adsorption methods—Single-point procedures).

In the first embodiment, the content of carbon black is from 40 to 80 parts by mass per 100 parts by mass of total of the diene rubber described above and the carboxynitrone described below. If the content of the carbon black is out of the range describe above, modulus or breaking strength is insufficient.

The content of carbon black is preferably from 60 to 85 parts by mass per 100 parts by mass of total of the diene rubber described above and the nitrone compound described below.

Nitrone Compound Having a Carboxy Group

As described above, a nitrone compound having a carboxy group (carboxynitrone) is contained in the first embodiment.

The carboxynitrone is not particularly limited as long as it is a nitrone that has at least one carboxy group (—COOH). The nitrone herein refers to a compound having a nitrone group represented by Formula (1) below.

[Chemical Formula 1]

Formula (1)

In Formula (1), * indicates a bond position.

The carboxynitrone is preferably a compound represented by Formula (b) below.

[Chemical Formula 2]

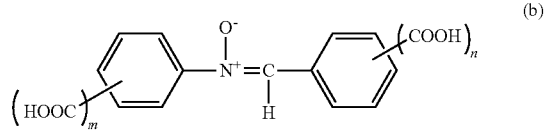

(b)

In Formula (b), m and n each independently represent an integer of 0 to 5, and a sum of m and n is 1 or greater.

The integer represented by m is preferably an integer of 0 to 2, and more preferably an integer of 0 or 1, because solubility to a solvent during carboxynitrone synthesis will be better and thus synthesis will be easier.

The integer represented by n is preferably an integer of 0 to 2, and more preferably an integer of 0 or 1, because solubility to a solvent during carboxynitrone synthesis will be better and thus synthesis will be easier.

Furthermore, the sum of m and n (m+n) is preferably from 1 to 4, and more preferably 1 or 2.

The compound is not particularly limited to a carboxynitrone such as that represented by Formula (b) but is preferably a compound selected from the group consisting of N-phenyl-α-(4-carboxyphenyl)nitrone represented by Formula (b1) below, N-phenyl-α-(3-carboxyphenyl)nitrone represented by Formula (b2) below, N-phenyl-α-(2-carboxyphenyl)nitrone represented by Formula (b3) below, N-(4-carboxyphenyl)-α-phenylnitrone represented by Formula (b4) below, N-(3-carboxyphenyl)-α-phenylnitrone represented by Formula (b5) below, and N-(2-carboxyphenyl)-α-phenylnitrone represented by Formula (b6) below.

[Chemical Formula 3]

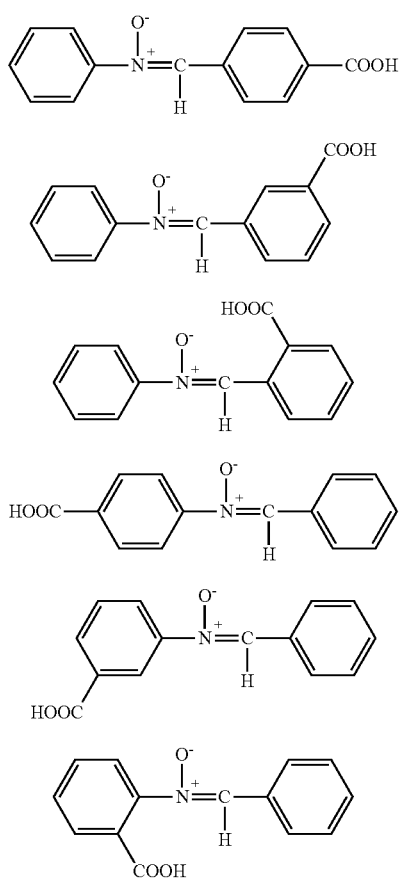

The method of synthesizing the carboxynitrone is not particularly limited, and conventionally known methods can be used. For example, a compound (carboxynitrone) having a carboxy group and a nitrone group can be obtained by stirring a compound having a hydroxyamino group (—NHOH) and a compound having an aldehyde group (—CHO) and a carboxy group at a molar ratio of hydroxyamino group to aldehyde group (—NHOH/—CHO) of 1.0 to 1.5 in the presence of an organic solvent (for example methanol, ethanol, tetrahydrofuran, and the like) at room temperature for 1 to 24 hours to allow the both groups to react.

In the first embodiment, the content of carboxynitrone is from 0.1 to 10 parts by mass per 100 parts by mass of total of the diene rubber and the carboxynitrone. If the content of the carboxynitrone is out of the range described above, low heat build-up property or modulus becomes insufficient.

The content of carboxynitrone is preferably from 0.3 to 3 parts by mass per 100 parts by mass of total of the diene rubber and the carboxynitrone.

Second Embodiment

As described above, in the second embodiment, the composition of the present invention (also simply referred to as the second embodiment hereinafter) contains a diene rubber and a carbon black. The diene rubber contains a natural rubber and a modified styrene-butadiene rubber (also referred to as a carboxynitrone-modified SBR) that can be obtained by a reaction of a nitrone compound having a carboxy group with a double bond of a styrene-butadiene rubber.

As described above, the second embodiment corresponds to an embodiment in which SBR in the diene rubber is modified with the carboxynitrone instead of blending carboxynitrone in the first embodiment described above.

Diene Rubber

As described above, the diene rubber contained in the second embodiment contains a natural rubber and a modified styrene-butadiene rubber (carboxynitrone-modified SBR) that can be obtained by a reaction of a nitrone compound having a carboxy group with a double bond of a styrene-butadiene rubber.

The diene rubber may contain a rubber component besides a natural rubber and a carboxynitrone-modified SBR. Such a rubber component is not particularly limited, but examples thereof include isoprene rubber (IR), butadiene rubber (BR), acrylonitrile-butadiene copolymer rubber (NBR), butyl rubber (IIR), butyl halide rubber (Br-IIR, Cl-IIR), and chloroprene rubber (CR).

Natural Rubber

A natural rubber contained in the diene rubber is not particularly limited.

The content of the natural rubber in the diene rubber is not less than 60 mass %. If the content of the natural rubber is less than 60 mass %, modulus or breaking strength is insufficient.

The content of the natural rubber in the diene rubber is preferably from 60 to 90 mass %.

Modified Styrene-Butadiene Rubber

As described above, the diene rubber contains a modified styrene-butadiene rubber (carboxynitrone-modified SBR) that can be obtained by a reaction of a nitrone compound having a carboxy group with a double bond of a styrene-butadiene rubber.

Specific examples and suitable embodiments of a styrene-butadiene rubber used for synthesis of carboxynitrone-modified SBR are the same materials as the styrene-butadiene rubbers contained in the first embodiment described above. Also, definitions, specific examples and suitable embodiments of a nitrone compound (carboxynitrone) having a carboxy group, which is used for synthesis of carboxynitrone-modified SBR, are the same as the carboxynitrones contained in the first embodiment described above.

A method of producing the modified styrene-butadiene rubber (carboxynitrone-modified SBR) via a reaction of a carboxynitrone with a double bond of a styrene-butadiene rubber is not particularly limited, and examples thereof include a method in which the styrene-butadiene rubber and the carboxynitrone are blended together for 1 to 30 minutes at 100 to 200° C.

When blended as such, a cycloaddition reaction occurs between the double bond of the butadiene contained in the styrene-butadiene rubber and the nitrone group in the carboxynitrone, forming a five-membered ring as illustrated in Formula (4-1) and Formula (4-2) below. Note that Formula (4-1) below represents a reaction between a 1,4 bond and a nitrone group, and Formula (4-2) below represents a reaction between a 1,2-vinyl bond and a nitrone group. Formula (4-1) and Formula (4-2) illustrate the reactions for the case where the butadiene is 1,3-butadiene, but the same reaction leads to a formation of a five-membered ring even in the case where the butadiene is other than 1,3-butadiene.

[Chemical Formula 4]

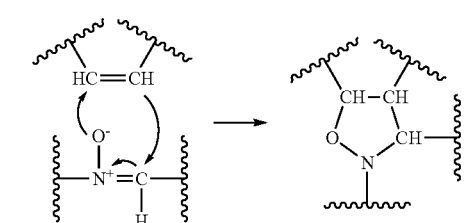

Formula (4-1)

[Chemical Formula 5]

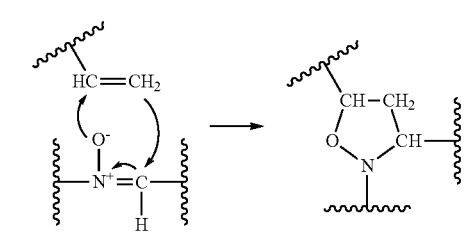

Formula (4-2)

The amount of the nitrone compound (carboxynitrone) (also referred to as a converted CPN amount hereinafter) that is used for synthesis of the modified styrene-butadiene rubber (carboxynitrone-modified SBR) per 100 parts by mass of the diene rubber is from 0.1 to 10 parts by mass. In particular, it is preferably from 0.3 to 3 parts by mass. If the converted CPN amount is out of the range of 0.1 to 10 parts by mass, low heat build-up property or modulus becomes insufficient.

For example, if 35 parts by mass of the carboxynitrone-modified SBR is contained per 100 parts by mass of the diene rubber and the carboxynitrone-modified SBR is obtained via the reaction between 100 parts by mass of SBR and 1 part by mass of carboxynitrone, 0.35 parts by mass (=35×(1/101)) of carboxynitrone is used for synthesis of the carboxynitrone-modified SBR, which is 35 parts by mass. Thus the converted CPN amount is 0.35 parts by mass.

For the synthesis of the carboxynitrone-modified SBR, the amount of the carboxynitrone per 100 parts by mass of SBR is not particularly limited, but it is preferably from 0.1 to 20 parts by mass and more preferably from 1 to 5 parts by mass. In particular, it is preferably not less than 2 parts by mass.

The degree of modification of the carboxynitrone-modified SBR is not particularly limited, but it is preferably from 0.02 to 4.0 mol % and more preferably from 0.10 to 2.00 mol %. In particular, it is preferably not less than 0.20 mol %.

Here, "degree of modification" refers to the proportion (mol %) of the double bonds modified with the carboxynitrone relative to the all double bonds attributed to butadiene (butadiene unit) in the styrene-butadiene rubber. For example, if the butadiene is 1,3-butadiene, "degree of modification" refers to the proportion (mol %) of the structure represented by Formula (4-1) above or Formula (4-2) above formed by modification with carboxynitrone. The degree of modification, for example, can be found by NMR measurements of the SBRs before and after the modification.

Note that the carboxynitrone-modified SBR with the degree of modification of 100 mol % is also classified as a diene rubber in the present specification.

The content of the carboxynitrone-modified SBR in the diene rubber is not particularly limited, but is preferably from 10 to 50 mass %, and more preferably from 20 to 40 mass %.

The total content of the natural rubber and the carboxynitrone-modified SBR in the diene rubber is not particularly limited, but preferably not less than 90 mass % and particularly preferably 100 mass %.

The amount of the styrene-butadiene rubber used for the synthesis of the modified styrene-butadiene rubber is not greater than 40 mass % with respect to the diene rubber. If the amount of the styrene-butadiene rubber used for the synthesis of the modified styrene-butadiene rubber is greater than 40 mass %, modulus or breaking strength is insufficient.

The amount of the styrene-butadiene rubber used for the synthesis of the modified styrene-butadiene rubber is preferably from 10 to 40 mass % with respect to the diene rubber.

For example, if the diene rubber contains 65 parts by mass of the natural rubber and 35 parts by mass of the carboxynitrone-modified SBR and the carboxynitrone-modified SBR is obtained via the reaction between 100 parts by mass of SBR and 1 part by mass of carboxynitrone, 34.65 parts by mass (=35×(100/101)) of SBR is used for synthesis of the carboxynitrone-modified SBR, which is 35 parts by mass. Thus the amount of the styrene-butadiene rubber used for the synthesis of the modified styrene-butadiene rubber is 34.65 parts by mass with respect to the diene rubber.

Carbon Black

A carbon black contained in the second embodiment is not particularly limited, and the specific examples thereof is the same as the carbon black contained in the first embodiment described above. Also, the nitrogen adsorption specific surface area ($N_2SA$) of the carbon black is not particularly limited, and the suitable embodiment is the same as the carbon black contained in the first embodiment described above.

In the second embodiment, the content of carbon black is from 40 to 80 parts by mass per 100 parts by mass of the diene rubber. If the content of the carbon black is out of the range describe above, modulus or breaking strength is insufficient.

The content of the carbon black is preferably 60 to 85 parts by mass per 100 parts by mass of the diene rubber.

Third Embodiment

As described above, in the third embodiment, the composition of the present invention (also simply referred to as the third embodiment hereinafter) contains a diene rubber and a carbon black. The diene rubber contains a natural rubber, a modified styrene-butadiene rubber (also referred to as a carboxynitrone-modified SBR) that can be obtained by a reaction of a nitrone compound having a carboxy group with a double bond of a styrene-butadiene rubber, and a styrene-butadiene rubber (unmodified styrene-butadiene rubber).

As described above, the third embodiment corresponds to an embodiment in which SBR in the diene rubber is modified with the carboxynitrone instead of blending carboxynitrone in the first embodiment described above.

A carbon black contained in the third embodiment is the same as those in the second embodiment described above. The diene rubber in the third embodiment is described in detail below.

Diene Rubber

As described above, the diene rubber contained in the third embodiment contains a natural rubber, a modified styrene-butadiene rubber (also referred to as a carboxynitrone-modified SBR) that can be obtained by a reaction of a nitrone compound having a carboxy group with a double bond of a styrene-butadiene rubber, and a styrene-butadiene rubber (unmodified styrene-butadiene rubber).

The diene rubber may contain a rubber component besides a natural rubber, a carboxynitrone-modified SBR, and a styrene-butadiene rubber. Such a rubber component is not particularly limited, but examples thereof include isoprene rubber (IR), butadiene rubber (BR), acrylonitrile-butadiene copolymer rubber (NBR), butyl rubber (IIR), butyl halide rubber (Br-IIR, Cl-IIR), and chloroprene rubber (CR).

Definitions, specific examples and suitable embodiments of the natural rubber and the carboxynitrone-modified SBR contained in the diene rubber are the same as the natural rubber and the carboxynitrone-modified SBR contained in the diene rubber contained in the second embodiment described above.

Specific examples and suitable embodiments of a styrene-butadiene rubber (unmodified styrene-butadiene rubber) contained in the diene rubber are the same as the styrene-butadiene rubber contained in the first embodiment described above.

The total amount of the styrene-butadiene rubber used for the synthesis of the modified styrene-butadiene rubber and the styrene-butadiene rubber in the diene rubber is not greater than 40 mass % with respect to the diene rubber. If the total amount above is greater than 40 mass %, modulus or breaking strength is insufficient.

The total amount of the styrene-butadiene rubber used for the synthesis of the modified styrene-butadiene rubber and the styrene-butadiene rubber in the diene rubber is preferably from 10 to 40 mass % with respect to the diene rubber.

For example, if the diene rubber contains 65 parts by mass of the natural rubber, 18 parts by mass of the carboxynitrone-modified SBR and 17 parts by mass of the styrene-butadiene rubber (unmodified styrene-butadiene rubber) and the carboxynitrone-modified SBR is obtained via the reaction between 100 parts by mass of SBR and 2 parts by mass of carboxynitrone, 17.65 parts by mass (=18×(100/102)) of SBR is used for synthesis of the carboxynitrone-modified SBR, which is 18 parts by mass. Thus the total amount (34.65 parts by mass) of the styrene-butadiene rubber used for the synthesis of the modified styrene-butadiene rubber (17.65 parts by mass) and the styrene-butadiene rubber (unmodified styrene-butadiene rubber) in the diene rubber (17 parts by mass) is 34.65 mass % with respect to the diene rubber (100 parts by mass).

Optional Components

The composition of the present invention may further contain additives as necessary within a scope that does not inhibit the effect or purpose thereof.

Examples of the additives include various additives that are typically used in rubber compositions, such as silica, silane coupling agents, zinc oxide (flower of zinc), stearic acid, adhesive resin, peptizing agent, antiaging agents, wax, processing aids, process oils, liquid polymers, terpene resins, thermosetting resins, tackifier resins, vulcanizing agents (for example, sulfur), and vulcanization accelerators.

Method for Producing Rubber Composition for Bead Filler

The method for producing the composition of the present invention is not particularly limited, and specific examples thereof include a method whereby each of the above-mentioned components is kneaded using a publicly known method and device (e.g. Bunbury mixer, kneader, roll, and the like). When the composition of the present invention contains a sulfur or a vulcanization accelerator, the components other than the sulfur and the vulcanization accelerator are preferably blended first at a high temperature (preferably 60° C. to 120° C.), then cooled, before the sulfur and the vulcanization accelerator are blended.

In addition, the composition of the present invention can be vulcanized or crosslinked under conventional, publicly known vulcanizing or crosslinking conditions.

Application

The composition of the present invention can be used suitably for a bead filler of a pneumatic tire.

Pneumatic Tire

The pneumatic tire of the present invention is a pneumatic tire including the composition of the present invention described above in the tire (preferably in bead fillers).

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, the pneumatic tire is formed from a pair of right and left bead portions 1, a pair of right and left sidewalls 2, and a tire tread portion 3 extending between both of the side walls 2. A carcass layer 4 embedded with steel cords is mounted between the pair of right and left bead portions 1. An end of the carcass layer 4 is folded around a bead core 5 and a bead filler 6 from a tire inner side to a tire outer side and turned up. In the tire tread portion 3, a belt layer 7 is provided along the entire periphery of the tire on the outer side of the carcass layer 4. At the both end portions of the belt layer 7, belt cushions 8 are provided. In the inner surface of the pneumatic tire, an innerliner 9 is provided to avoid leakage of air charged in the tire inner portion to the outside of the tire. A tie rubber 10 is laminated in between the carcass layer 4 and the innerliner 9 to bond the innerliner 9. The bead filler 6 is formed from the composition of the present invention described above.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

Examples

Hereinafter, the present invention will be further described in detail with reference to examples; however, the present invention is not limited thereto.

Synthesis of Carboxynitrone

In a 2 L egg-plant shaped flask, methanol heated to 40° C. (900 mL) was placed, and then terephthalaldehydic acid represented by Formula (b-1) below (30.0 g) was added and dissolved. To this solution, a solution in which phenylhydroxylamine represented by Formula (a-1) below (21.8 g) was dissolved in methanol (100 mL) was added and stirred at room temperature for 19 hours. After the completion of stirring, a nitrone compound having a carboxy group (carboxynitrone) represented by Formula (c-1) below (41.7 g) was obtained by recrystallization from methanol. The yield was 86%.

[Chemical Formula 6]

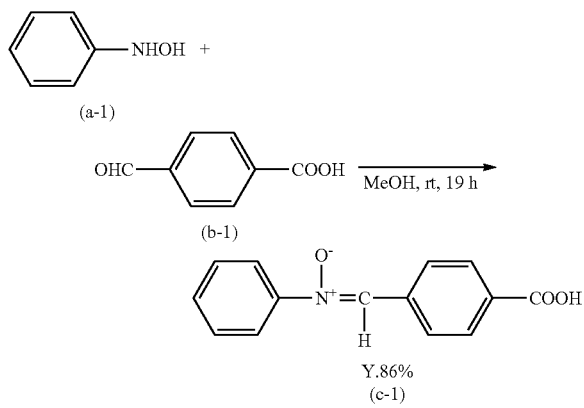

Synthesis of Diphenylnitrone

In a 300 mL egg-plant shaped flask, benzaldehyde represented by Formula (6) below (42.45 g) and ethanol (10 mL) were placed, and then a solution in which phenylhydroxylamine represented by Formula (5) below (43.65 g) was dissolved in ethanol (70 mL) was added and stirred at room temperature for 22 hours. After the completion of stirring, a nitrone compound without a carboxy group (diphenylnitrone) represented by Formula (7) below (65.40 g) was obtained as white crystal by recrystallization from ethanol. The yield was 83%.

[Chemical Formula 7]

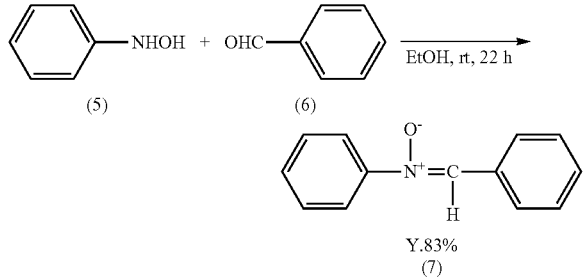

Synthesis of Carboxynitrone-Modified SBR (Modified SBR 1)

SBR (Nipol 1502, manufactured by Nihon Zeon Corp.) was loaded in a Bunbury mixer at 120° C. and masticated for 2 minutes. Then, 1 part by mass of the carboxynitrone synthesized as above was added per 100 parts by mass of SBR and mixed at 150° C. for 6 minutes to modify the SBR with the carboxynitrone. The carboxynitrone-modified SBR obtained thus is referred to as the modified SBR 1.

The degree of modification was determined by $^1$H-NMR measurement (CDCl$_3$, 400 MHz, TMS) comparing the peak areas in the vicinity of 8.08 ppm (attributed to 2 protons adjacent to the carboxy group) before and after the modification of the SBRs. The degree of modification for the modified SBR 1 was 0.19 mol %.

Synthesis of Carboxynitrone-Modified SBR (Modified SBR 2)

SBR was modified with the carboxynitrone according to the same method as for the modified-SBR 1, except that the compounding amount of the carboxynitrone was changed to 2 parts by mass instead of 1 part by mass. The carboxynitrone-modified SBR obtained thus is referred to as the modified SBR 2.

The degree of modification was determined by $^1$H-NMR measurement (CDCl$_3$, 400 MHz, TMS) comparing the peak areas in the vicinity of 8.08 ppm (attributed to 2 protons adjacent to the carboxy group) before and after the modification of the SBRs. The degree of modification for the modified SBR 2 was 0.43 mol %.

Synthesis of Diphenylnitrone-Modified SBR (Comparative Modified SBR)

SBR was modified with the diphenylnitrone according to the same method as for the modified-SBR 1, except that the diphenylnitrone synthesized as above was used instead of carboxynitrone. The diphenylnitrone-modified SBR obtained thus is referred to as the comparative modified SBR.

The degree of modification was determined by $^1$H-NMR measurement (CDCl$_3$, 400 MHz, TMS) comparing the peak areas attributed to a phenyl group. The degree of modification for the comparative modified SBR was 0.21 mol %.

Preparation of Rubber Composition for Bead Filler

The components shown in Tables 1 below were compounded in the proportions (part by mass) shown in Table 1 below.

Specifically, the components shown in Table 1 below except for the sulfur and the vulcanization accelerator were first mixed in a Bunbury mixer with a temperature of 80° C. for 5 minutes. Thereafter, a roll was used to mix the sulfur and the vulcanization accelerator to obtain each rubber composition for a bead filler ("rubber composition for a bead filler" is also referred to as "rubber composition" hereinafter).

For the modified SBR 1 in Table 1, the values listed at the top within the cell are the values for parts by mass of modified SBR 1, and the values listed at the bottom (in parentheses) are the values for parts by mass of SBR used for synthesis of modified SBR 1, the parts by mass of which is listed above. The same applies to the modified SBR 2 and the comparative modified SBR.

Note that the Working Examples 1 and 3 correspond to the second embodiment described above and Working Example 2 corresponds to the third embodiment described above. Working Example 4 corresponds to the first embodiment described above.

Preparation of Vulcanized Rubber Sheet

A vulcanized rubber sheet was prepared by press-vulcanizing each of the obtained (unvulcanized) rubber compositions for 15 minutes at 160° C. in a mold (15 cm×15 cm×0.2 cm).

Evaluation of Heat Build-Up

The loss tangent at a temperature of 60° C., tan δ (60° C.), was measured for the obtained vulcanized product in each example using a viscoelastic spectrometer (manufactured by Toyo Seiki Seisaku-sho, Ltd.) under the following conditions: 10% initial distortion, ±2% amplitude, and 20 Hz frequency. The results are shown in Table 1 (Heat Build-up). The results were expressed as index values, with the tan δ (60° C.) of Comparative Example 1 defined as 100. Smaller values indicate superior low heat build-up.

Evaluation of Modulus

A vulcanized rubber sheet was prepared in the same manner as in the evaluation of heat build-up described above. The prepared vulcanized rubber sheet was cut out in a dumbbell-shape (dumbbell-shape No. 3) of 2 mm thickness and used as a test piece.

The 100% modulus (stress at 100% elongation) [in MPa] of the obtained test piece was measured in accordance with JIS K6251:2010. The results are shown in Table 1 (Modulus M100). The results were expressed as index values, with the 100% modulus of Comparative Example 1 defined as 100. Larger index values indicate greater modulus.

Note that, converted nitrone amounts in Table 1 refer to the converted CPN amounts described above (Working Examples 1 to 3), parts by mass of carboxynitrone per 100 parts by total mass of the diene rubber and carboxynitrone (Working Example 4), and parts by mass of diphenylnitrone used for synthesis of the comparative modified SBR per 100 parts by mass of the diene rubber (Comparative Example 2).

The degree of modification in Table 1 refers to the degree of modification described above. Note that, for examples using diphenylnitrone, the degree of modification refers to the proportion (mol %) of the double bonds modified with diphenylnitrone relative to all the double bonds attributed to butadiene in the SBR.

Modified SBR 2: modified SBR 2 synthesized as described above
Comparative Modified SBR: comparative modified SBR synthesized as described above
Carboxynitrone: carboxynitrone synthesized as described above
Carbon black: SEAST N ($N_2SA$: 74 [$m^2/g$], manufactured by Tokai Carbon Co., Ltd.)
Zinc oxide: Zinc Oxide III (Seido Chemical Industry Co., Ltd.)
Stearic acid: Stearic acid YR (manufactured by NOF Corporation)
Anti-aging agent: SANTOFLEX 6PPD (manufactured by Soltia Europe)
Process oil: Extract No. 4 S (manufactured by Showa Shell Seikyu K.K.)
Vulcanization accelerator: Nocceler CZ-G (manufactured by Ouchi Shinko Chemical Industrial Co., Ltd.)
Sulfur: oil treatment sulfur (manufactured by Karuizawa Refinery Ltd.)

As is evident from Table 1, Working Example 4 (which contained carboxynitrone) and Working Examples 1 to 3 (which contained carboxynitrone-modified SBR) exhibited superior low heat build-up and greater modulus, compared to Comparative Examples 1 and 2 (which contained neither carboxynitrone nor carboxynitrone-modified SBR). Among these, Working Examples 1 to 3 (which contained carboxynitrone-modified SBR) exhibited even more superior low heat build-up and even greater modulus.

TABLE 1

|  | Comparative Example 1 | Comparative Example 2 | Example 1 | Example 2 | Example 3 | Example 4 |
|---|---|---|---|---|---|---|
| Natural Rubber | 65 | 65 | 65 | 65 | 65 | 65 |
| SBR | 35 |  |  | 17 |  | 34 |
| Modified SBR1 |  |  | 35 (34.65) |  |  |  |
| Modified SBR2 |  |  |  | 18 (17.65) | 35 (34.31) |  |
| Comparative Modified SBR |  | 35 (34.65) |  |  |  |  |
| Carboxynitrone |  |  |  |  |  | 1 |
| Carbon Black | 70 | 70 | 70 | 70 | 70 | 70 |
| Zinc Oxide | 3 | 3 | 3 | 3 | 3 | 3 |
| Stearic Acid | 1 | 1 | 1 | 1 | 1 | 1 |
| Antiaging Agent | 1 | 1 | 1 | 1 | 1 | 1 |
| Processing Oils | 5 | 5 | 5 | 5 | 5 | 5 |
| Vulcanization Accelerator | 1 | 1 | 1 | 1 | 1 | 1 |
| Sulfur | 3 | 3 | 3 | 3 | 3 | 3 |
| Converted Nitrone Amount [parts by mass] | — | 0.35 | 0.35 | 0.35 | 0.69 | 1.00 |
| Modification Condition | — | 150° C. 6 minutes | 150° C. 6 minutes | 150° C. 6 minutes | 150° C. 6 minutes | — |
| Degree of Modification | — | 0.21 | 0.19 | 0.19 | 0.43 | — |
| Heat Build-up (index) | 100 | 103 | 92 | 93 | 85 | 97 |
| Modulus M100 (index) | 100 | 96 | 107 | 108 | 112 | 104 |

The details of each component shown in Table 1 above are as follows.

Natural rubber: TSR20

SBR: Nipol 1502 (styrene unit content: 23.5 mass %, Mw: 450,000, manufactured by Nihon Zeon Corp.)

Modified SBR 1: modified SBR 1 synthesized as described above

From the comparison between Working Examples 1 and 3, Working Example 3, in which the degree of modification of the carboxynitrone-modified SBR was not less than 0.30 mol %, exhibited even more superior low heat build-up and even greater modulus.

From the comparison between Working Examples 2 and 3, Working Example 3, in which the content of the carboxynitrone-modified SBR in the diene rubber was not less than 20 mass %, exhibited even more superior low heat build-up and even greater modulus.

REFERENCE SIGNS LIST

1 Bead portion
2 Sidewall portion
3 Tire tread portion
4 Carcass layer
5 Bead core
6 Bead filler
7 Belt layer
8 Belt cushion
9 Innerliner
10 Tie rubber

The invention claimed is:

1. A rubber composition for a bead filler, the rubber composition comprising:
a diene rubber;
a carbon black; and
a nitrone compound having a carboxy group;
the diene rubber comprising a natural rubber and a styrene-butadiene rubber, wherein a content of the natural rubber in a total of the diene rubber and the nitrone compound is not less than 60 mass %, and a content of the styrene-butadiene rubber in a total of the diene rubber and the nitrone compound is not greater than 40 mass %;
a content of the carbon black being from 40 to 80 parts by mass per 100 parts by mass of a total of the diene rubber and the nitrone compound; and
a content of the nitrone compound being from 0.1 to 10 parts by mass per 100 parts by mass of a total of the diene rubber and the nitrone compound.

2. A rubber composition for a bead filler, the rubber composition comprising:
a diene rubber; and
a carbon black;
the diene rubber comprising a natural rubber and a modified styrene-butadiene rubber, wherein the modified styrene-butadiene rubber is obtained by a reaction of a nitrone compound having a carboxy group with a double bond of a styrene-butadiene rubber;
a content of the natural rubber in the diene rubber being not less than 60 mass %;
an amount of the styrene-butadiene rubber used for synthesis of the modified styrene-butadiene rubber being not greater than 40 mass % with respect to the diene rubber;
an amount of the nitrone compound used for synthesis of the modified styrene-butadiene rubber being 0.1 to 10 parts by mass per 100 parts by mass of the diene rubber; and
a content of the carbon black being 40 to 80 parts by mass per 100 parts by mass of the diene rubber.

3. A rubber composition for a bead filler, the rubber composition comprising:
a diene rubber; and
a carbon black;
the diene rubber comprising a natural rubber, a modified styrene-butadiene rubber, and a styrene-butadiene rubber, wherein the modified styrene-butadiene rubber is obtained by a reaction of a nitrone compound having a carboxy group with a double bond of a styrene-butadiene rubber;
a content of the natural rubber in the diene rubber being not less than 60 mass %;
a total amount of the styrene-butadiene rubber used for synthesis of the modified styrene-butadiene rubber and the styrene-butadiene rubber in the diene rubber being not greater than 40 mass % with respect to the diene rubber;
an amount of the nitrone compound used for synthesis of the modified styrene-butadiene rubber being 0.1 to 10 parts by mass per 100 parts by mass of the diene rubber; and
a content of the carbon black being 40 to 80 parts by mass per 100 parts by mass of the diene rubber.

4. The rubber composition for a bead filler according to claim 2, wherein a degree of modification of the modified styrene-butadiene rubber is from 0.02 to 4.0 mol %, wherein "degree of modification" refers to a proportion (mol %) of double bonds modified with the nitrone compound relative to all the double bonds attributed to butadiene in styrene-butadiene rubber.

5. The rubber composition for a bead filler according to claim 1, wherein a styrene unit content of the styrene-butadiene rubber is not less than 10 mass %.

6. The rubber composition for a bead filler according to claim 1, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

7. The rubber composition for a bead filler according to claim 1, wherein a nitrogen adsorption specific surface area of the carbon black is from 40 to 150 $m^2/g$.

8. A pneumatic tire wherein the rubber composition for a bead filler described in claim 1 is used.

9. The rubber composition for a bead filler according to claim 3, wherein a degree of modification of the modified styrene-butadiene rubber is from 0.02 to 4.0 mol %, wherein "degree of modification" refers to a proportion (mol %) of double bonds modified with the nitrone compound relative to all the double bonds attributed to butadiene in styrene-butadiene rubber.

10. The rubber composition for a bead filler according to claim 2, wherein a styrene unit content of the styrene-butadiene rubber is not less than 10 mass %.

11. The rubber composition for a bead filler according to claim 3, wherein a styrene unit content of the styrene-butadiene rubber is not less than 10 mass %.

12. The rubber composition for a bead filler according to claim 4, wherein a styrene unit content of the styrene-butadiene rubber is not less than 10 mass %.

13. The rubber composition for a bead filler according to claim 9, wherein a styrene unit content of the styrene-butadiene rubber is not less than 10 mass %.

14. The rubber composition for a bead filler according to claim 2, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

15. The rubber composition for a bead filler according to claim 3, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

16. The rubber composition for a bead filler according to claim 4, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

17. The rubber composition for a bead filler according to claim 5, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

18. The rubber composition for a bead filler according to claim 9, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

19. The rubber composition for a bead filler according to claim 10, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

20. The rubber composition for a bead filler according to claim 11, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

* * * * *